United States Patent [19]

Todaka

[11] Patent Number: 4,866,662

[45] Date of Patent: Sep. 12, 1989

[54] MEMORY CONNECTED STATE DETECTING CIRCUIT

[75] Inventor: Seiji Todaka, Kawasaki, Japan

[73] Assignee: Kabushiki Kaisha Toshiba, Kawasaki, Japan

[21] Appl. No.: 913,394

[22] Filed: Sep. 30, 1986

[30] Foreign Application Priority Data

Sep. 30, 1985 [JP] Japan .................................. 60-217131

[51] Int. Cl.[4] .......................... G06F 11/28; G06F 7/04
[52] U.S. Cl. ...................................... 364/900; 371/21; 364/944.92; 364/947.2
[58] Field of Search ... 364/200 MS File, 900 MS File; 371/21, 25, 24, 71

[56] References Cited

U.S. PATENT DOCUMENTS

| | | | |
|---|---|---|---|
| 3,579,199 | 5/1971 | Anderson et al. | 371/24 X |
| 3,751,649 | 8/1973 | Hart, Jr. | 371/71 X |
| 4,195,770 | 4/1980 | Benton et al. | 371/24 X |
| 4,369,511 | 1/1983 | Kimura et al. | 371/21 |
| 4,370,746 | 1/1983 | Jones et al. | 371/21 X |
| 4,450,560 | 5/1984 | Conner | 371/25 |
| 4,601,034 | 7/1986 | Sridhar | 371/25 |
| 4,667,330 | 5/1987 | Kumagai | 371/24 X |

Primary Examiner—Thomas M. Heckler
Attorney, Agent, or Firm—Foley & Lardner, Schwartz, Jeffery, Schwaab, Mack, Blumenthal & Evans

[57] ABSTRACT

A memory connected state detecting circuit for automatically detecting the memory connected condition, comprising a timing circuit responsive to a certain operation mode signal and a clock signal for producing different timing and control signals and address information, a switching circuit for controlling the read-/write operations in such a manner that each data for checking is written in each of designated addresses and it is read just after it has been written, and a latching circuit for latching the data read from the memory. With this construction, it has become possible to detect whether or not the memory capacity of an additional memory or memories mounted can sufficiently cover the memory area designated by a computer, without providing any mechanical switches and associated wiring.

9 Claims, 3 Drawing Sheets

MEMORY CONNECTED STATE DETECTING CIRCUIT

BACKGROUND OF THE INVENTION

1. Field of the Invention

The present invention relates to a memory connected state detecting circuit for detecting whether or not a memory is connected to a designated address where information written in a computer system. It is particularly useful in a personal computer system, which use a plurality of memories such as RAMs.

2. Description of the Prior Art

In personal computers, a RAM or RAMs (random access memory) are used as a memory and a desired memory capacity is obtained by mounting a plurality of RAM boards, having, for instance, 128 k bits of memory capacity. In these personal computers, it is normal to use less than the actual capacity of the RAM boards. For instance, even when it is possible to arrange maximum memory capacity of 640 k bits as a RAM by using up to five memory boards each having 128 k bits, it is often the case that the maximum memory capacity is not actually used, rather a memory capacity of up to 256 k bits is used by mounting two RAM boards each having the 128 k bits.

On the other hand, it is often necessary to preliminarily know the total memory capacity of the RAM boards to be used, so as to attain a desired memory capacity. For this reason, switches are provided in the prior art of the kind, which preliminarily set up the RAM memory capacity. Actual RAM memory capacity is identified by the operated condition of the switches. In these computer memory testing systems, the switches must be placed where they are easily accessible to users of the system. Consequently, additional spaces as well as an additional hardware including mechanical switches, terminals, and associated wiring, are required.

This is not economical, because of the need of various components. In addition, when the setting up of the actual memory capacity using these switches is erroneously done, it results in a malfunction, since the cause of the error can not be specified.

SUMMARY OF THE INVENTION

It is therefore an object of the present invention to overcome the above drawbacks and to provide a memory connected state detecting circuit in which the memory connected state can accurately be detected by a relatively simple circuit without using mechanical switches, terminals, and additional wiring.

It is another object of the present invention to provide a memory connected state detecting circuit in which malfunction due to an erroneous setting of the switches can be prevented.

It is still another object of the present invention to provide a memory connected state detecting circuit capable of detecting the condition, whether or not the memory capacity of an additional memory or memories mounted can sufficiently cover the address area designated by a microprocessor.

It is still further object of the present invention to provide a memory connected state detecting circuit in which predetermined data is read just after it has been written in an address designated by a microprocessor and the predetermined data is compared with the data read from the designated address, thereby detecting whether or not the memory capacity of an additional memory or memories connected to a computer system can cover the address area designated by the microprocessor.

One of the features of the present invention resides in a memory connected state detecting circuit for automatically detecting whether or not a memory is connected to a computer system up to a particular address designated by a computer, especially a microprocessor, which comprises: timing circuit means responsive to a read mode signal, a clock signal for producing different timing signals, control signals, and address information; switching circuit means connected between a data bus and the microprocessor for controlling the read/write operations about predetermined data for checking the memory connected state as well as normal data to be transacted by the microprocessor to or from the memory in such that the data is read just after is has been written in each of the designated addresses of the memory; and data latching means having first and second latch circuits, connected to the data bus for latching various data read from the memory including the predetermined data for checking in accordance with the read/write operations, thereby detecting the memory connected state from the comparison of the predetermined data for checking with the data read from each of the designated addresses of the memory.

These and other objects, features and advantages of the invention will be better understood from the following description of the invention with reference to the accompanying drawings.

DESCRIPTION OF THE PREFERRED EMBODIMENT

Figure 1:
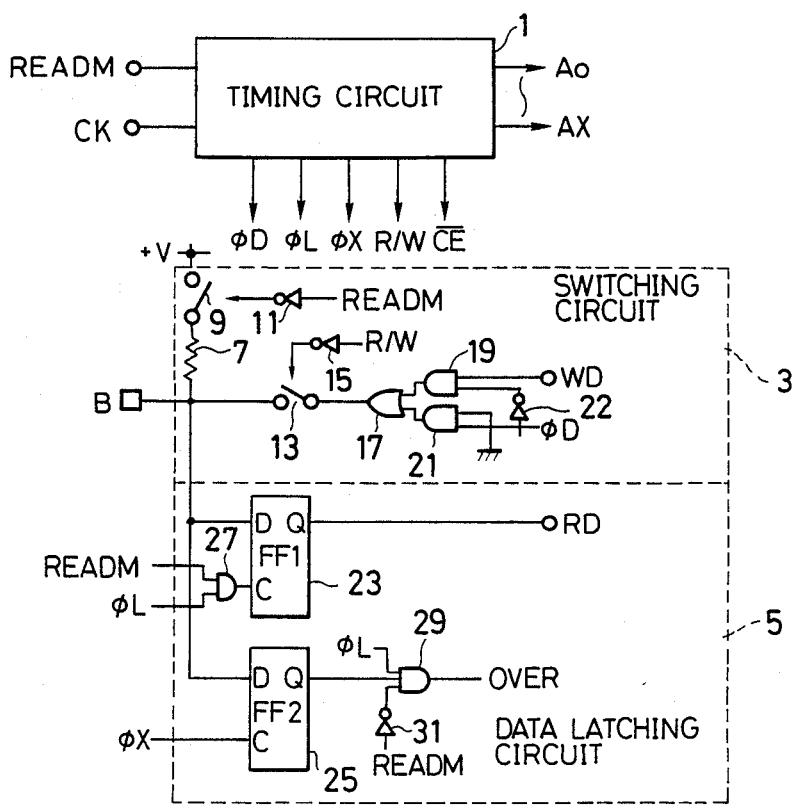
FIG. 1 is a circuit diagram of the memory connected state detecting circuit as one embodiment according to the present invention.

Referring to FIG. 1, the memory connected state detecting circuit according to the present invention comprises a timing circuit 1 responsive to a read mode signal READM, which is provided by outside means such as microprocessor not shown and a clock signal CK for producing different signals such as different timing signals $\phi D$, $\phi L$, $\phi x$, read/write control signal R/W, a chip select signal $\overline{CE}$, and address information Ao–Ax, a switching circuit 3 for supplying write data to a data bus B so as to store it in a RAM, and a data latch circuit 5 for latching the data read out of the RAM to the data bus B and for producing it therefrom.

Although not shown in the figure, but controlled by the R/W signal and a chip select signal $\overline{CE}$ produced from timing circuit 1, information or data is either written into or read from each of memory locations of addresses designated by the address information Ao–Ax. The write data WD to be written into the RAM is applied to the data bus B from an AND circuit 19 provided at the switching circuit 3. On the other hand, the data which has been read from the RAM is produced, through a D-type flip flop 23 of the data latch 5, from the data bus B.

The switching circuit 3 comprises a first switch 9 for raising the data bus B to +V voltage through resistor 7, an inverter 11 for supplying an inverted signal of the read mode signal READM so as to control the switch 9, a second switch 13 connected directly to the data bus B and controlled by the signal R/W through the inverter 15, AND circuits 21 and 19 connected respectively to an OR circuit 17, the output of which is connected to one terminal of the switch 13, and an inverter 22 connected to one input of the AND circuit 19. The other input of the AND circuit 19 is applied with a write data WD, while one input of the AND circuit 21 is connected to the ground and the other input of and AND circut 21 is supplied with the signal $\phi D$.

The data latch circuit 5 comprises a first D-type flip flop 23 for latching the read data RD, a second D-type flip-flop 25 for latching a predetermined data for checking whether or not the RAM is connected, that is, a low level data in this embodiment, an AND circut 27, the output of which is connected to the clock input C of the first D-type flip flop 23, and a second AND circuit 29 connected to the output Q of the second D-type flip flop 25, and an inverter 31 connected to the input of the AND circuit 29. To the input of the AND circuit 29, there is also applied a timing signal $\phi L$ and a read mode signal READM through the inverter 31 as well as the output signal from the output Q of the flip flop 25. A no-connection signal OVER is produced from the AND circut 29, which is indicates that the address area which was not included in the memory area of a RAM mounted to the system has been accessed. T0 the clock input C of the second D-type flip flop 25, there is supplied with the timing signal $\phi x$ and to each of the data inputs D of the first and second D-type flip flop 23 and 25, there is connected the data bus B. The read data RD is produced from the output Q of the first D-type flip flop 23.

With the memory connected state detecting circuit thus constructed, before writing into each of designated addresses the information supplied by the microprocessor not shown, predetermined data for checking, i.e., low level data in this case, is written into the designated address and just after this operation, the data thus written is read out of the address, so as to carry out a memory verification operation. After this operation, the information supplied from the microprocessor is written into the address designated.

In the memory verification operation, when the written data is equal to the read-out data, the RAM or RAMs thus mounted to the system is available up to a certain address area in question. On the other hand, however, when the actual address area of the RAM memory thus connected does not reach the address in question, the written data will differ from the read-out data, thereby producing an non-available signal or no-connection signal OVER.

Figure 2:
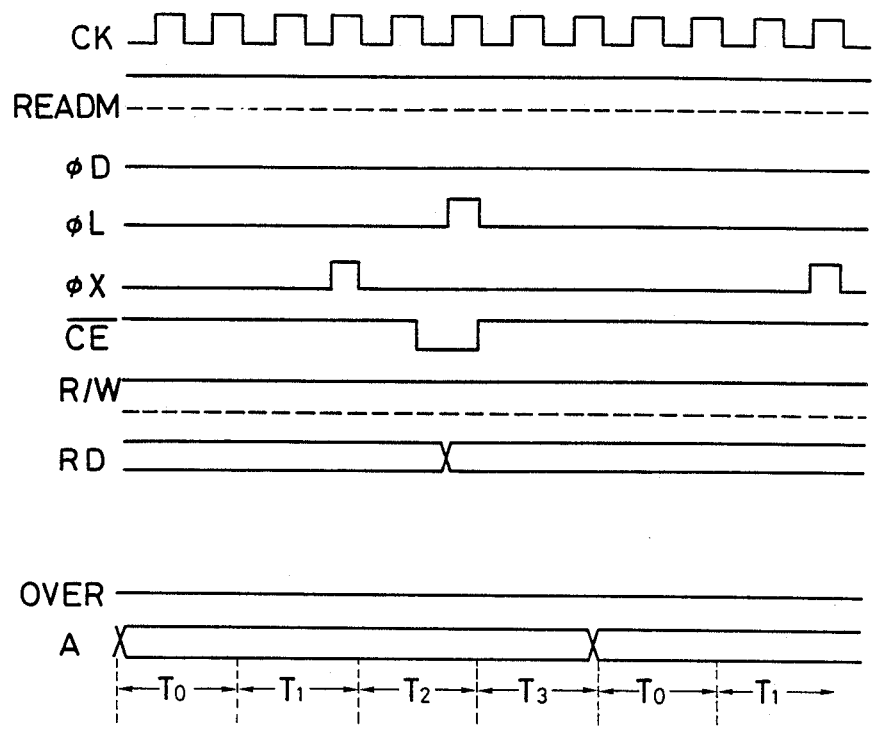
FIG. 2 is a timing chart for explaining the operation of the memory connected state detecting circuit shown in FIG. 1, particularly in the read mode.
Figure 3:
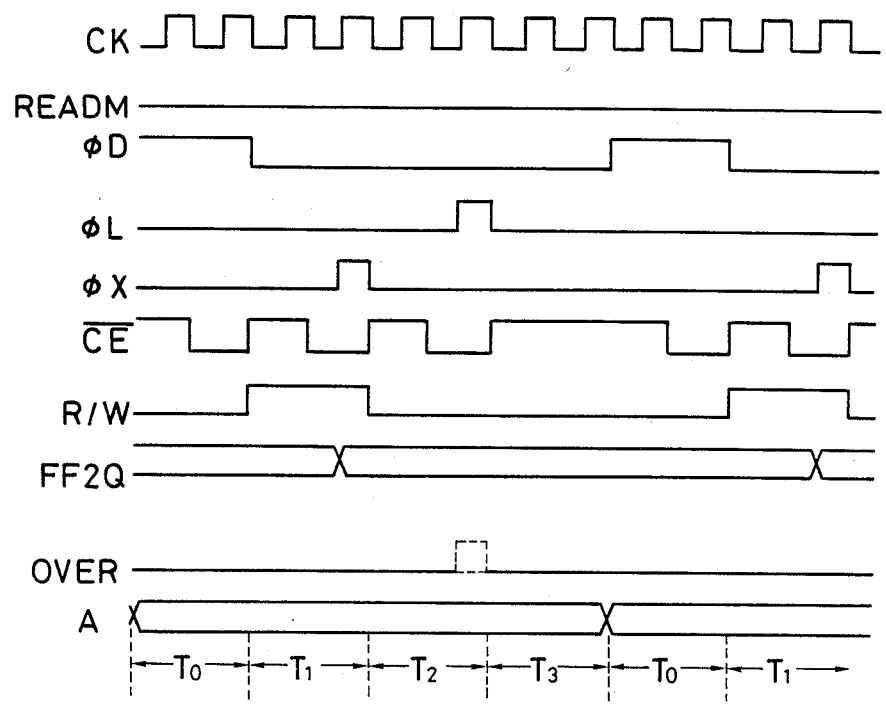
FIG. 3 is a timing chart for explaining the operation of the memory connected state detecting circuit shown in FIG. 1, particularly in the write mode.

The operation of the memory connected state detecting circuit will now be described with reference to the timing charts of FIGS. 2 and 3.

First of all, the operation of the read mode is decribed. The read mode is same as that of the normal read operation and the read mode signal READM is in high level condition. As a result, the switch 9 is in the OFF condition and only the AND circuit 27 passes the read mode signal READM with the timing signal $\phi L$, unless an output signal is not produced by the blocking of the AND circuit 29. Also, in this case, the read/write control signal R/W is in a high level condition and information is applied to the RAM by designating the read mode. The switch 13 is in the OFF condition in this case. The address information Ao–Ax is applied to the RAM by designating an address of the RAM to be read. When the chip select signal $\overline{CE}$ is produced in this condition, the information is read from the designated address in the RAM into the data bus B.

The data thus read into the data bus B is applied to the data input D of the first D-type flip flop 23. Accordingly, when the timing signal $\phi L$ is produced at this time, the data is latched on the D-type flip flop 23 through the AND circuit 27 and it is read out of the output terminal Q of the flip flop 23.

In the write mode, the read mode signal READM and read/write control signal R/W are both low level, so that the switches 9 and 13 are rendered ON condition respectively. As a result, the AND circuit 29 is gated by the inverted signal of the read mode signal READM through the inverter 31. In this write mode, one cycle of the address information A is divided into four subcycles having equal time periods of T0, T1, T2, and T3. In the first time period of T0, the predetermined data for checking, i.e., the data having low level is written into the designated address into which information should be written and in the next time period T1, the predetermined data for checking which has just been written is read therefrom. If the result of the data thus read is not correct, the no-connection signal OVER is produced from the AND circuit 29.

In the time period T3, the information to be written in the RAM, which is being supplied from the microprocessor not shown is written. In this case the timing signal $\phi D$ is made high level in the first time period T0 in order to write the predetermined data for checking while the timing signal $\phi x$ is also made high level in the time period T1 so as to latch the predetermined data for checking, which has been read in the next time period T1, on the second D-type flip flip 25.

When the data thus latched on the second D-type flip flop 25 is not correct, the output signal from the second D-type flip flop 25 is gated by the timing signal oL in the AND circuit 29 in order to produce the no-connection signal OVER since the timing signal $\phi L$ is made high level in the third time period of T2.

On the other hand, the read/write control signal R/W is made low level in the time periods T0 and T2 in order to designate the write mode while in the time period of T1 it is made high level in order to designate the read mode. The chip select signal $\overline{CE}$ is repeated in high and low level conditions alternatively so as to designate the RAM in each of the time periods. The address information Ao–Ax is maintained at same value in one cycle consisting of the time periods of T0 to T4.

After the write mode, the designated address is produced from the timing circuit 1 as address information A0–Ax so as to write desired information from the microprocessor, while the write data WD is applied to the AND circuit 19. In this condition, the timing signal $\phi D$ becomes high level in the first time period T0 and the output signal from the OR circuit 17 becomes low level due to the inverted signal of the timing signal $\phi D$ through the inverter 22. The low level signal thus produced in applied to the data bus B through the switch 13, as a low level write signal. This low level write signal indicates the predetermined data for checking.

In the time period T0, the read/write control signal R/W is made low level. Consequently, when the chip select signal $\overline{CE}$ becomes low level at this time, a particular memory location of the RAM is designated and the predetermined data for checking, i.e., the data having a low level is written in the designated address.

In the next time period T1, the timing signal φD becomes low level while the read/write control signal R/W becomes high level, thereby designating the read mode. The high level R/W signal is inverted by the inverter 15 and it turns off the switch 13. In this case, the write data WD is blocked so as not to supply to the data bus B through the AND circuit 19 and the OR circuit 17. In the time period T1, when the read/write control signal R/W becomes high level while the chip select signal $\overline{CE}$ becomes low level, the low level signal as the predetermined data for checking, which has been written in the time period T0 from the designated address of the RAM is read in the data bus B. The data thus read is applied to the data input D of the second D-type flip flop 25 from the data bus B.

When the timing signal φx is supplied to the clock terminal C of the second D-type flip flop 25, it is latched in the D-type flip flop 25. The signal thus latched is applied to the AND circuit 29 from the output Q of the flip flop 25. When the timing signal φL is produced in the next time period T2, it is produced from the AND circuit 29. Since the predetermined data for checking is same as the low level signal which has been written in the time period T0, the signal read in the time period T1 will be a low level signal, just as the signal produced from the AND circuit 29 through the second D-type flip flop 25 will also be the low level signal. This means that the RAM is connected to the designated address in question.

On the other hand, when the read signal is of high level, its level differs from that of the written data, the no-connection signal having high level is produced from the AND circuit 29, thereby detecting that the RAM is not mounted to the designated address in question.

Moreover, when the read/write control signal R/W becomes low level in the time period T2, the switch 13 is turned ON and the write data WD is applied to the data bus B. Accordingly, when in this case the chip select signal $\overline{CE}$ becomes low level, the write data WD is written in the designated address in the RAM.

In the foregoing embodiment, the predetermined data to be written for checking has been described as a low level signal, it is apparent that it is not limited to the low level signal but it may be a high level signal.

In the memory connected state detecting circuit according to the present invention, since predetermined information is read just after the information has been written in a designated address in question in a write mode operation, and the memory connected state can be detected by the comparison of the read-out information with the predetermined information, a hardware structure can be simplified and economical as specific switches, terminals, wiring used in the prior art are not needed.

In addition, additional spaces are not required because of the miniturization of the circuit and a malfunction, such as erroneous setting up of the switches can also be prevented from occuring, unlike the one according to the prior art.

While the invention has been described in its preferred embodiment, it is to be understood that the words which have been used are words of description rather than limitation and that various changes and modification may be made within the purview of the appended claims without departing from the true scope and spirit of the invention in its broader aspects.

What is claimed is:

1. A memory state detecting circuit for automatically detecting if a memory is connected with a computer at a particular address designated by said computer, comprising:
    a data bus;
    a microprocessor;
    a switching circuit connected between said data bus and said microprocessor for controlling the read/write operations of predetermined check data, said check data being read just after having been written in the designated address of the memory;
    first latching means connected to said data bus for latching a low level signal as the predetermined check data to be written in the memory in accordance with the read/write operations; and
    a second latching means connected to said data bus for latching the check data read from the memory in accordance with the read/write operations, the memory state at the designated address thereby being detected by means comparing the predetermined check data latched by said first latching means to the check data latched by said second latching means;
    wherein said switching circuit includes a switch and a resistor connected between a high level voltage source and the data bus, said switch being turned off while data is being written into the memory and turned on while data is being read from the memory.

2. The memory state detecting circuit as claimed in claim 1, further including means for timing the operation of each cycle of said circuit, wherein one cycle of an operation for processing one address designated by the microprocessor is divided into four time periods.

3. The memory state detecting circuit as claimed in claim 2 wherein the first time period is provided for performing the write operation for the predetermined check data.

4. The memory state detecting circuit as claimed in claim 3 wherein the second time period is provided for performing the read operation for the predetermined check data.

5. The memory state detecting circuit as claimed in claim 2 wherein a third time period is provided for performing the write operation for normal data.

6. The memory state detecting circuit as claimed in claim 2 wherein the fourth time period is provided for performing the read operation for normal data.

7. The memory state detecting circuit as claimed in claim 1 wherein the level of said predetermined check data for checking the memory state is negative.

8. The memory state detecting circuit as claimed in claim 1 wherein said memory includes one or more RAMs in the computer system.

9. A method of automatically detecting the memory condition of a memory at a particular address designated by a computer, comprising:
    generating timing signals responsive to address information;
    supplying said timing signals to a switching circuit, said switching circuit controlling the read/write operations of a memory state circuit;
    writing check data in a memory address selected by said switching circuit;

reading said check data immediately after it is written in said memory;

latching said check data in a first latching circuit;

deriving predetermined check data from a data bus and latching said data in a second latching circuit; and comparing the latched data in each circuit to develop an output determinative of the memory condition of the selected address.

* * * * *